(12) United States Patent
Stevens et al.

(10) Patent No.: US 9,753,486 B2
(45) Date of Patent: Sep. 5, 2017

(54) CLOCK GATING WITH AN ASYNCHRONOUS WRAPPER CELL

(71) Applicant: UNIVERSITY OF UTAH RESEARCH FOUNDATION, Salt Lake City, UT (US)

(72) Inventors: Kenneth S. Stevens, Salt Lake City, UT (US); Dipanjan Bhadra, Salt Lake City, UT (US)

(73) Assignee: UNIVERSITY OF UTAH RESEARCH FOUNDATION, Salt Lake City, UT (US)

( * ) Notice: Subject to any disclaimer, the term of this patent is extended or adjusted under 35 U.S.C. 154(b) by 0 days.

(21) Appl. No.: 14/740,052

(22) Filed: Jun. 15, 2015

(65) Prior Publication Data

US 2016/0363955 A1 Dec. 15, 2016

(51) Int. Cl.
*G06F 1/10* (2006.01)
(52) U.S. Cl.
CPC ...................................... *G06F 1/10* (2013.01)
(58) Field of Classification Search
CPC ........................................................ G06F 1/10
See application file for complete search history.

(56) References Cited

U.S. PATENT DOCUMENTS

| | | | |
|---|---|---|---|
| 5,566,130 A | 10/1996 | Durham et al. | |
| 6,204,711 B1 | 3/2001 | Scarlett et al. | |
| 6,292,044 B1 | 9/2001 | Mo et al. | |
| 6,550,013 B1 | 4/2003 | Gervais et al. | |
| 6,557,161 B2 | 4/2003 | Jones | |
| 6,735,139 B2 | 5/2004 | Tang | |
| 6,989,695 B2 | 1/2006 | Dike et al. | |
| 7,657,862 B2 | 2/2010 | Kishinevsky et al. | |
| 7,786,758 B2 | 8/2010 | Kuhn | |
| 7,924,110 B2 | 4/2011 | McCorquodale et al. | |
| 8,051,396 B2 | 11/2011 | Beerel et al. | |
| 8,060,771 B2 | 11/2011 | Tyrrell | |
| 8,238,190 B2 | 8/2012 | Ja et al. | |
| 8,363,766 B2 * | 1/2013 | Akers | G06F 1/12 375/354 |

(Continued)

OTHER PUBLICATIONS

Wu, "Clock-Gating and Its Application to Low Power Design of Sequential Circuits," IEEE Transactions on Circuits and Systems I: Fundamental Theory and Applications, 2000, vol. 47, No. 103, pp. 415-420.

(Continued)

*Primary Examiner* — Patrick O'Neill
(74) *Attorney, Agent, or Firm* — Michael Best & Friedrich LLP

(57) ABSTRACT

Technology is described for an asynchronous wrapper circuit for a clock gating cell (CGC). In one example, the asynchronous wrapper cell for CGC includes circuitry configured to (1) sample a data channel via sampling circuitry for a communication start signal to enable the CGC to start a gated clock for a data message on the data channel, and (2) reset an enable of the CGC to an idle mode via idle mode control circuitry after the data message has been clocked via the CGC through function cell circuitry. The idle mode control circuitry generates an output for the sampling circuitry from the function cell. Various other computing circuitries are also disclosed.

19 Claims, 9 Drawing Sheets

(56) References Cited

U.S. PATENT DOCUMENTS

| 8,453,079 B2 | 5/2013 | Manohar |
| 8,933,724 B2 * | 1/2015 | Cressman ............. G06F 1/3237 326/28 |
| 2013/0035099 A1 | 2/2013 | Boejer et al. |
| 2013/0043904 A1 | 2/2013 | Ivory |

OTHER PUBLICATIONS

Horak et al., "A Low-Overhead Asynchronous Interconnection Network for GALS Chip Multiprocessors," IEEE Transactions on Computer-Aided Design of Integrated Circuits and Systems, 2011, vol. 30, Issue 4, pp. 494-507.

Muttersbach et al., "Globally-asynchronous locally-synchronous architectures to simplify the design of on-chip systems," Twelfth Annual IEEE International ASIC/SOC Conference, 1999, pp. 317-321.

* cited by examiner

CLOCK GATING WITH AN ASYNCHRONOUS WRAPPER CELL

FIELD OF THE INVENTION

The invention relates to a reactive clock gating cell design based on asynchronous design techniques.

BACKGROUND

Clock gating is a technique used in many synchronous circuits for reducing dynamic power dissipation. Clock gating saves power by adding more logic to a circuit to prune a clock tree. Pruning the clock disables portions of the circuitry so that the flip-flops and logic in the circuitry do not switch states. Switching states consumes power. When digital circuitry is not being switched, the switching power consumption goes to approximately zero, where only small leakage currents are incurred.

Clock gating works by controlling the enable conditions attached to registers, and uses that control to gate the clocks. A design should contain these enable conditions in order to use and benefit from clock gating. The clock gating may reduce the die area, as well as reduce power consumption, because clock gating logic may replace multiplexers (muxes). However, the clock gating logic can also change the clock tree structure, since the clock gating logic may be part of the clock tree.

SUMMARY

In one embodiment, the invention provides a reactive clock gating cell that includes a clock gating cell (CGC), a sampling circuit, and an idle mode control circuit. The CGC is configured to generate a gated clock from an enabled clock (e.g., enabled local clock), and the gated clock provides a clock for a function cell. The sampling circuit is configured to sample a data channel for a communication start signal to enable the CGC to start the gated clock for a data message on the data channel. An idle mode control circuit can be coupled to the function cell and the sampling circuit and can be configured to reset an enable of the CGC to an idle mode after the data message has been clocked through the function cell. The data message can be a monotonic combinational logic signal. In an example, the data channel includes a data valid channel.

In one example, the sampling circuit includes a NOR gate and a C-element. NOR gate inputs are coupled to an idle mode control circuit output and the data channel. C-element inputs are coupled to a NOR gate output and the data channel, and a C-element output is coupled to a CGC enable input of the CGC. In another example, the sampling circuit includes an OR gate. OR gate inputs are coupled to an idle mode control circuit output and the data channel, and an OR gate output is coupled to a CGC enable input of the CGC. In another example, the sampling circuit includes an asynchronous finite state machine (AFSM). AFSM inputs are coupled to an idle mode control circuit output and the data channel, and an AFSM output is coupled to a CGC enable input of the CGC. In another example, the sampling circuit includes an inverter and a C-element. An inverter input is coupled to the data channel. C-element inputs are coupled to an idle mode control circuit output and an inverter output, and a C-element output is coupled to a CGC enable input of the CGC.

In another configuration, the reactive clock gating cell includes a synchronization cell coupled between the data channel and inputs to the sampling circuit. The synchronization cell synchronizes the data message to a clock (e.g., local clock). The synchronization cell includes a synchronization cell clock input coupled to the clock, a synchronization cell data input coupled to the data channel, and a synchronization cell output coupled to a data channel input of the sampling circuit. In another example, the synchronization cell includes at least two latches in series to further synchronize the data message. A first synchronization latch data input is coupled to the data channel, a first synchronization latch output is coupled to a second synchronization latch data input, and a second synchronization latch output is coupled to the data channel input of the sampling circuit.

In another configuration, the idle mode control circuit generates a reset signal after an entire data message propagates through the function cell. The idle mode control circuit can be integrated with the function cell. The data channel includes a busy state when the data message is being transmitted and/or processed and an idle state when no data message is being transmitted.

In an example, the CGC includes a latch and an AND gate. The latch includes a latch clock input, an enable input, and a latch output. A latch clock input is coupled to a clock and the enable input is coupled to a sampling circuit output. AND gate inputs are coupled to the latch output and the clock, and an AND gate output provides the gated clock. In another example, the function cell includes a universal asynchronous receiver/transmitter (UART), an inter-integrated circuit (I2C), an integrated interchip sound (I2S), or serial peripheral interface (SPI).

In another embodiment, the invention provides an asynchronous wrapper circuit (AWC) for the clock gating cell (CGC). The AWC includes circuitry configured to sample a data channel via sampling circuitry for a communication start signal to enable the CGC to start a gated clock for a data message on the data channel, and reset an enable of the CGC to an idle mode via idle mode control circuitry after the data message has been clocked via the CGC through function cell circuitry. The idle mode control circuitry generates an output for the sampling circuitry from the function cell circuitry.

In an example, the circuitry is configured to generate the gated clock from an enabled clock via CGC circuitry. The gated clock provides a clock for the function cell circuitry. The circuitry can also be configured to generate gated function via the function cell circuitry clocked by the gated clock.

In another embodiment, the invention provides a method of generating asynchronous control for the clock gating cell (CGC). The method includes the step of transmitting a data message via data channel to a function cell clocked by a gated clock generated from the CGC. The step of triggering a communication start signal from a beginning of the data message to enable the CGC to start the gated clock for the data message on the data channel follows. The next step of the method is triggering a CGC reset signal from an output of the function cell to stop the gated clock from the CGC after the data message has been clocked through the function cell.

In an example, the step of triggering the CGC reset signal further includes triggering a busy control signal from the communication start signal or the data message, asserting the busy control signal during propagation of the data message through the function cell, and de-asserting the busy control signal after the data message has been clocked through the function cell.

In another example, the step of triggering the communication start signal includes generating a pulse to enable the CGC to start the gated clock, and/or the step of triggering the CGC reset signal further comprises generating a pulse to disable the CGC to stop the gated clock.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Numbers provided in flow charts and processes are provided for clarity in illustrating steps and operations and do not necessarily indicate a particular order or sequence. Reference is made to digital signals (e.g., a logic one (or "one") or a logic high voltage; or a logic zero (or "zero") or a logic low voltage) that represent corresponding voltages for a specified time duration as recognized by one skilled in the relevant art. For example, the logic high voltage represents a nominal 1.5 volts (V), 1.8V, 2.5V, and 3.3V; and the logic low voltage represents a nominal 0V or ground.

This description provides an overview of various circuits and components that can be used to provide clock gating and improvements to clock gating. The circuits include a clock gating circuit, a sampling circuit, control logic to place a system (e.g., function block or function cell) in an idle mode (i.e., not clocked), and synchronizing logic to synchronize an asynchronous data message on a data channel with the gated local clock generated by the clock gating circuit. The terms "circuit," "cell," "block," "module," and "submodule" may be used interchangeability for a circuit with one or more components that provides a specified function, unless otherwise stated. A system may include one or more blocks. The term "channel" refers to a physical transmission medium between components, circuits, or systems, such as a conductive line, wire, a pin, a signal trace, or other coupling between electrical components, circuits, or systems. In wireless applications, a channel includes a radio channel. The phrases "data channel" and "communication link" may be used interchangeability for a means by which data is transmitted. A data message or communication message is transmitted on the data channel. In a wired or optical configuration, the data channel is a data line or data bus. In a wireless configuration, the data message is transmitted on the data channel using a wireless protocol then transmitted on the data line or data bus within a wireless device.

Figure 1:
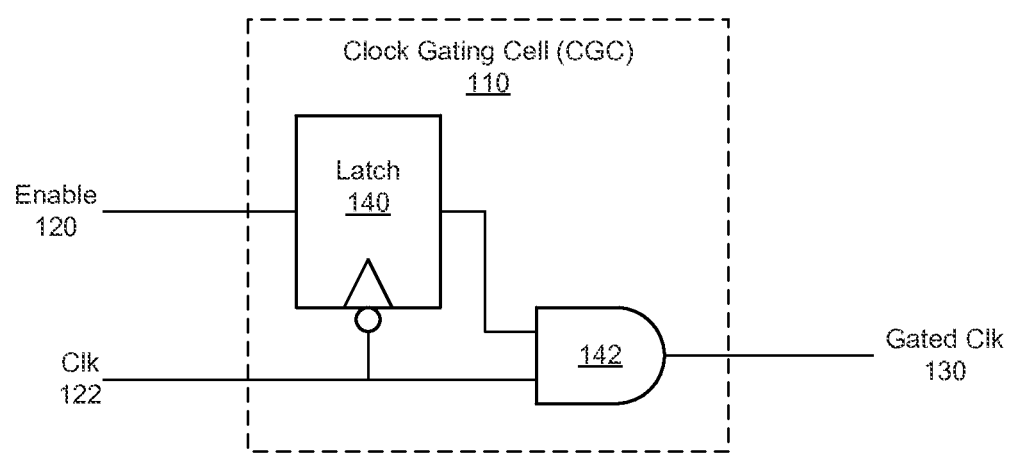
FIG. 1 illustrates a schematic diagram of a clock gating cell (CGC).

FIG. 1 illustrates an example of a clock gating cell (CGC) 110. A CGC interface includes an enable input 120 and a clock (clk) input 122 and a gated clock output 130. The CGC 110 includes a latch 140 (e.g., flip-flop) and a AND gate 142 as circuit components. The latch 140 is a circuit that has two stable states (e.g., zero or one) and can be used to store state information based on a clock signal. The enable input 120 is coupled to a latch data input, the latch clock input is coupled to the clock signal, and the latch data output is coupled to an AND gate input. Another AND gate input is coupled to the clock input 122 and an AND gate output is coupled to the gated clock output 130. In operation, the latch input of the latch 140 receives an enable signal (e.g., a logic zero) on the enable input 120 and stores (or latches) the signal on a next falling edge of a clock signal, representing an enabled state. As used herein, "clock" refers to a clock signal with a regular pattern of high and low states (e.g., a square wave with a 50% duty cycle with a fixed, constant frequency). Then, the latch 140 propagates the stored signal (e.g., the logic zero) on to a latch output, which becomes an input for the AND gate 142, along with the clock input 122. In the enabled state, the AND gate 142 generates a gated clock signal on the gated clock output 130 that follows the clock on the clock input 122.

Depending on the configuration of the latch and/or coupling to the latch, the latch output may have the same value (i.e., non-inverted value) as the input in the previous clock cycle, or the latch output may have the inverted value of the input from the previous clock cycle. The CGC 110 is shown with the latch output following the latch input (i.e., non-inverted). Depending on the configuration of the latch, the latch may store and/or output a value on either rising edge or the falling edge of the clock.

When a disable signal (i.e., non-enable signal, for example, a logic one) occurs on the enable input 120 (i.e., the latch data input), a disabled state occurs in the latch 140 on the next falling edge of the clock. Then, the AND gate 142 turns off the gated clock and blocks the clock on the clock input 122 from passing to the gated gate output. Thus, the gated clock is controlled by the enable input 120.

In other examples, other components and configurations of the CGC may be implemented to perform clock gating, depending on whether the enable signal is a logic one or a logic zero, as recognized by one skilled in the relevant art.

As used herein, turning off clock gating refers to turning off or blocking the clock to the function block using the CGC 110, and turning on clock gating refers to turning on the clock to the function block using the CGC 110. As used in the examples, an asserted signal refers to a logic one, and de-asserted or un-asserted signal refers to a logic zero.

Clock gating can be applied to modern clocked digital circuit designs in order to reduce power consumption. For example, the CGC 110 blocks propagation of the clock signal before the signal reaches memory banks, which have a high capacity load. Clock gating occurs when the particular portion of the data path is not currently in use. Often clock gating is produced through enable signals generated from the present circuit state.

In many clocked systems, a dependency exists between the clock, which enables the sampling and observing data, and the observation and evaluation of data signals, which dictate whether operations (using the clock) are required and/or if clock gating may occur. Typical clocking methodologies necessitate employing the clock to determine the status of the clock gating signals (e.g., enable and disable signals). The circular dependency between the clock and the data indicating a signal may or may not be gated in typical clocking methodologies creates inefficiencies in the ability to clock gate a system. So in typical clocking methodologies, the clock is employed to evaluate the gating signal, and is thus active on that subset of signals. Thus, typical clock gating is applied to block of a system after a data sampling block, but may not be applied to the sampling data block and/or the entire system.

Many communication circuits (e.g., UART, I2C, I2S, SPI, and many other communication peripherals and protocols) have interdependency between the clock and the data signals that determine if there is valid data. A universal asynchronous receiver/transmitter (UART) is computer hardware that translates data between parallel and serial forms. Inter-integrated circuit (I$^2$C or I2C) is a multi-master, multi-slave, single-ended, serial computer bus used for attaching low-speed peripherals to computer motherboards and embedded systems. Integrated interchip sound (I$^2$S, I2S, Inter-IC Sound, or IIS) is an electrical serial bus interface standard used for connecting digital audio devices together. I$^2$S is used to communicate pulse-code modulation (PCM) audio data between integrated circuits in an electronic device. The I$^2$S bus separates clock and serial data signals, resulting in a lower jitter than is typical of communications systems that recover the clock from the data stream. Serial peripheral interface (SPI) bus is a synchronous serial communications device used for short distance, single master communication.

Even when idle, these communication circuits and systems typically sample the communication links to determine if valid data has arrived, which disables clock gating to subsequent functions blocks (i.e., turning on the clock) to process the data. Clock gating sampling cells prevents the blocks from registering the changes on the polled signals.

Thus, typical communication circuits use some type synchronous circuit to sample at least one data channel of the communication link. As a result, a typical sampling circuit is a synchronous circuit (or clock circuit) that does not use and/or benefit from clock gating. A synchronous circuit is a digital circuit in which the parts or components are synchronized by a clock signal.

Asynchronous circuits and systems, on the other hand, are reactive to system changes. An asynchronous circuit, or self-timed circuit, is a sequential digital logic circuit which is not governed by a clock circuit or global clock signal. Instead asynchronous circuits often use signals that indicate completion of instructions and operations, specified by data transfer protocols.

Asynchronous circuits do not need to sample data at predetermined intervals to determine data validity. As soon as data changes, the asynchronous circuit reacts to the change and modifies the state of the circuit. Thus, such asynchronous designs can remain completely idle (similar to a fully gated system), but then immediately react when an event occurs which requires a response.

Due to the reactive property of asynchronous systems, asynchronous circuits can provide a solution to building a reactive clock gating cell. Clock gating (or CGC) based on asynchronous design techniques is referred to as reactive clock gating (or reactive CGC). Reactive clock gating reactively changes clock gating states based on an input signal, and thus removes a need for a clock to sample the input signal. So, the CGC 110 may also be used in asynchronous communication and/or with asynchronous circuits used in communication to lower dynamic power usage.

Reactive clock gating uses an asynchronous circuit implemented to detect when a circuit or system has moved from an idle state to a busy state. The asynchronous circuit uses reactive logic that expends little to no functional energy while detecting a state transition. As soon as the state transition occurs, the clock is started and data can be sampled at a specified frequency.

Reactive clock gating can be achieved with an asynchronous clock gating wrapper that is placed around a clocked system. The asynchronous wrapper allows a system clock to be completely gated off even for blocks which are polling data and waiting for event on a signal path. The asynchronous wrapper reacts to an event on the signal path by activating the enable signal to turn on the clock signal to the block. The asynchronous wrapper can eliminate the need to continuously clock various blocks (e.g., data sampling blocks) and can provide a significant power advantage.

The asynchronous wrapper is a circuit configured to generate the enable signal for the clock (e.g., gated clock from the CGC 110), which can be optimized to allow the enclosed combinational logic (e.g., register banks) to function at a desired frequency. For most slow peripherals (e.g., UART and I2C), the asynchronous wrapper does not limit the performance of the devices. A latency penalty may exist if the signal comes from another clock domain and the clock gating logic is synchronized with a local clock. Latency is a measure of the time delay experienced by a system. More specifically, latency is a time interval between stimulation and a response.

Figure 2A:
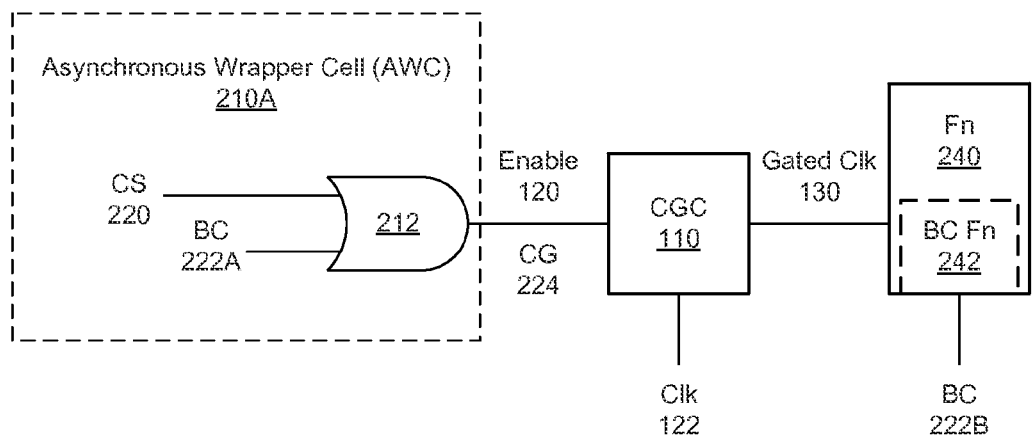
FIG. 2A illustrates a schematic diagram of a function cell coupled to a reactive clock gating cell using an AND gate.
Figure 3A:
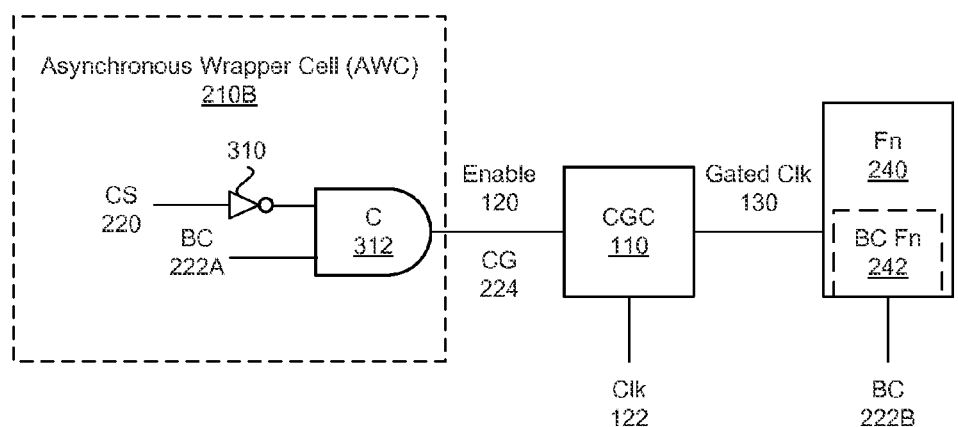
FIG. 3A illustrates a schematic diagram of a function cell coupled to a reactive clock gating cell using an inverter and a C-element.
Figure 3B:
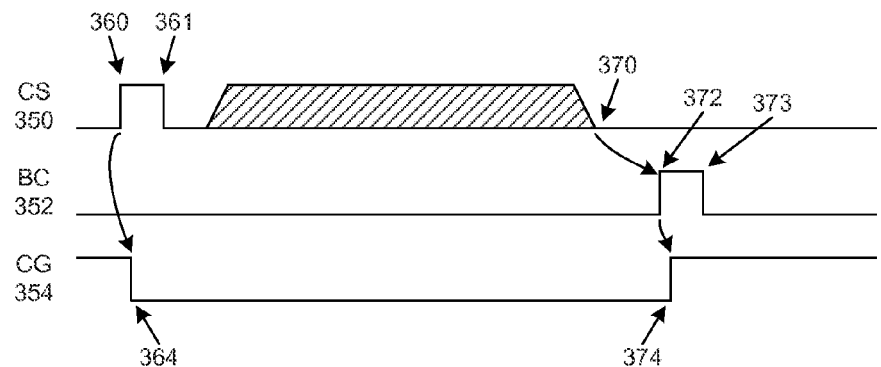
FIG. 3B illustrates a timing diagram for an asynchronous wrapper cell of the reactive clock gating cell of FIG. 3A.
Figure 4A:
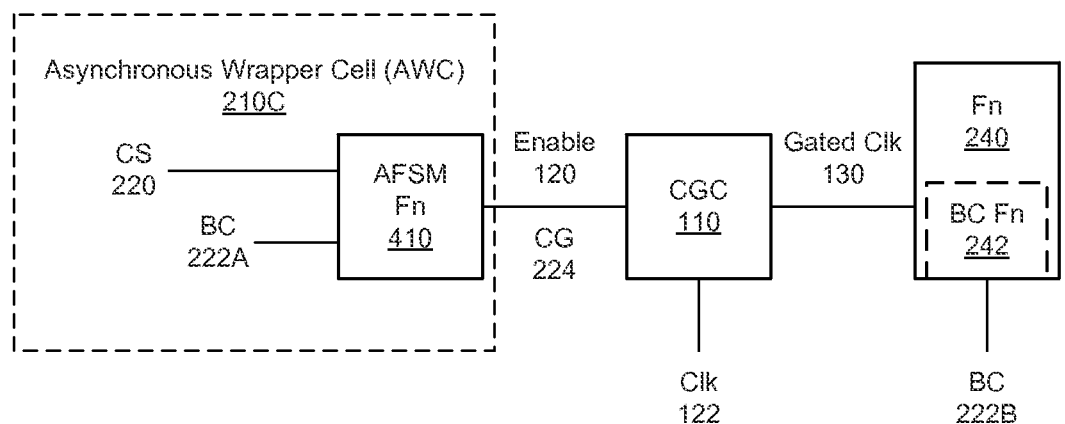
FIG. 4A illustrates a schematic diagram of a function cell coupled to a reactive clock gating cell using an asynchronous finite state machine (AFSM).
Figure 4B:
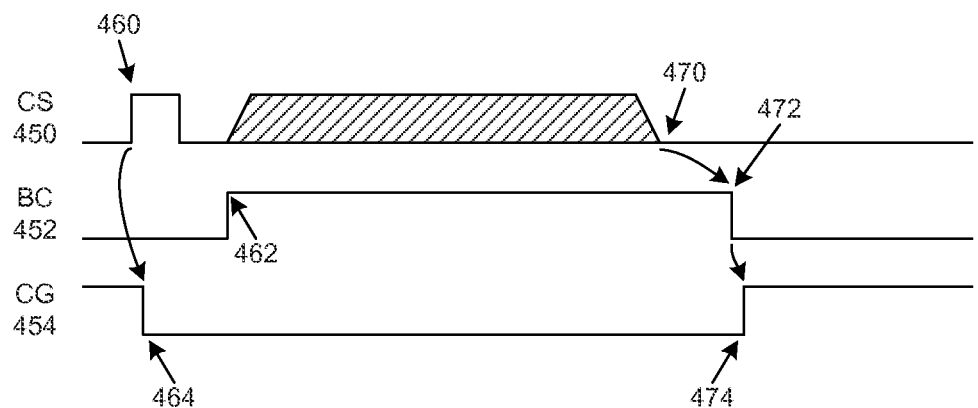
FIG. 4B illustrates a timing diagram for an asynchronous wrapper cell of the reactive clock gating cell of FIG. 4A.

The asynchronous wrapper can be used as an asynchronous interface around many communication protocol which polls or samples in order to determine when an event or action (e.g., valid data) occurs. FIGS. 2A, 3A, and 4A illustrate examples of asynchronous wrappers that can be used with the many communication circuits (e.g., UART, I2C, I2S, SPI, and many other communication peripherals and protocols). The asynchronous wrapper can include front-end circuitry that generates the enable signal (and receives a disable signal) for the CGC 110 and back-end circuitry clocked by the CGC 110 to generate the disable signal. The back-end circuitry may be integrated with a function block clocked by the CGC 110. Each example in FIGS. 2A, 3A, and 4A generates different timing, as shown in FIGS. 2B, 3B, and 4B, based the circuitry used.

FIG. 2A illustrates an asynchronous wrapper using an OR gate 212. Generally, an asynchronous wrapper cell (AWC) provides the front end circuitry to generate the enable signal (e.g., logic one) and disable signal (e.g., logic zero) for the CGC 110. The AWC can be included in an asynchronous wrapper circuit that includes both the front-end circuitry (e.g., AWC 210A) and the back-end circuitry for generating an idle mode signal (i.e., the disable signal). The AWC is also referred to as a sampling cell with idle mode control. The AWC includes two inputs and an output. The AWC inputs include a communication start (CS) channel 220 (or communication start input) that receives a communication start signal and a busy control (BC) channel 222A (or busy control input) that receives a busy control signal. The output of the AWC is a clock gate (CG) channel 224 (clock gate output) that generates a clock gate signal for the enable input 120 of the CGC 110. The communication start channel 220 and the busy control channel 222A are coupled to inputs of the OR gate 212 and the clock gate channel 224 is coupled to the output of the OR gate 212. The OR gate 212 is used to generate the clock gate signal where clock gate signal is a logical OR of the communication start signal and the busy control signal.

The gated clock output 130 is coupled to a clock input of a function (Fn) block 240. The clock input provides the clock for the function block 240. The function block includes combinational logic, functions, or other logic components and/or circuitry. In an example, the function block includes data sampling circuitry, communication link sampling circuitry, latches, and/or register banks. The function block can also provide at least one output for the back-end circuitry of the asynchronous wrapper, which can be used to determine when the function block is in an idle state. When the function block is in an idle state, the back-end circuitry generates an idle mode signal on a busy control output (or the busy control channel 222B), which is coupled to a busy control input (or the busy control channel 222A) of the AWC. The idle mode signal (i.e., busy control signal) is used to generate the disable signal for the CGC 110. The back-end circuitry is referred to as a busy control function block 242. In another example, a subset of the circuitry of the function block includes the busy control function block 242 used to generate the idle mode signal (or busy control signal). The busy control function block 242 can be integrated with the function block. A large number of variations of combinational logic can be used by the busy control function block 242 can be used based on the functions of the function block.

Figure 2B:
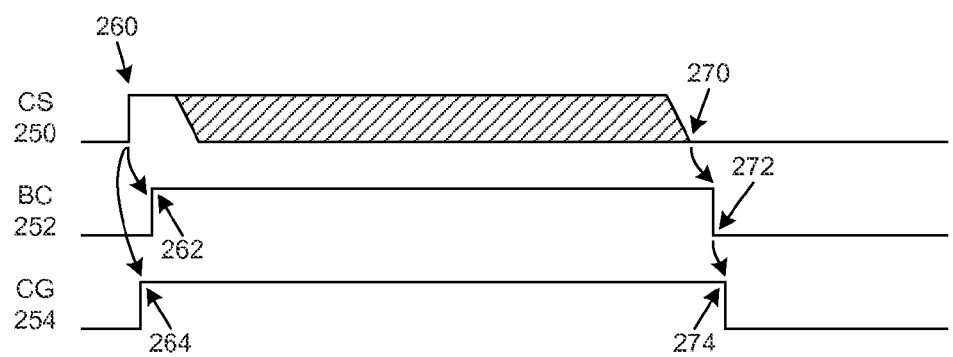
FIG. 2B illustrates a timing diagram for an asynchronous wrapper cell (AWC) of the reactive clock gating cell of FIG. 2A.

FIG. 2B illustrates a timing diagram for the AWC 210A of the reactive clock gating cell of FIG. 2A. A communication start signal 250 represents timing on communication start channel 220. The communication start signal 250 provides an indication that data from the data channel is valid. A busy control signal 252 represents timing on busy control channel 222A, 222B. The busy control signal provides an indication that the function block has completed processing of a data message. A clock gate signal represents timing on clock gate channel 224. The clock gate signal provides the enable signal for the CGC 110. In FIGS. 2B, 3B, and 4B, a logic zero on the clock gate channel 224 enables the CGC 110 (i.e., turns the clock on to the function block) and a logic one on the clock gate channel 224 disables the CGC 110 (i.e., turns the clock off to the function block).

The communication start signal 250 detects the start of a transmission that initially asserts clock gate signal (i.e., high voltage). The busy control signal 252 ensures that the clock gate signal 254 remains asserted (i.e., high voltage) for the entire message and enables clock gating to occur again at the end of a message (i.e., disables gated clock of the CGC 110). For proper operation, the busy control signal 252 needs to assert (i.e., high voltage) before the communication start signal 250 can un-assert. In general, the clock gate signal 254 asserts 264 on or shortly after communication starts 260, and the clock gate signal 254 de-asserts 274 when or shortly after busy control signal 252 un-asserts 272. The term "shortly after" refers to delays due to changing state in the logic and/or gates in the circuit (e.g., the AWC). The communication start 260 begins the clocking of the function block and as a result the busy control function block 242 asserts 262 the busy control signal 252 some time (e.g., due to delays in clocking, propagation, and state changes in logic and/or gate(s)) thereafter. The busy control signal 252 un-asserts 272 some time (e.g., due to delays in clocking, propagation, and state changes in logic and/or gate(s)) after the communication stops 270.

FIG. 3A illustrates an asynchronous wrapper using an inverter 310 and a C-element 212. An inverter (i.e., NOT gate) is a logic gate which implements logical negation. A C-element (i.e., Muller C-gate or Muller C-element) is an asynchronous logic component or control circuit where an output reflects the inputs when the states of all inputs match; otherwise when the states of the inputs differ the output maintains the prior state. The C-element is a sequential circuit that asserts when both inputs assert, and un-asserts when both inputs un-assert. For example, the output of a two input C-element is a logic zero if both inputs are logic zeros and the output is a logic one if both inputs are logic ones. Otherwise, the output has the same value as the previous output state (i.e., one input is a logic zero when other input is a logic one).

An AWC 210B provides an example of the front end circuitry to generate the enable signal (e.g., logic zero) and disable signal (e.g., logic one) for the CGC 110. The communication start channel 220 is coupled to an input of the inverter 310, and an output of the inverter and the busy control channel 222A are coupled to inputs of the C-element 312 and the clock gate channel 224 is coupled to the output of the C-element 312. By tying the inverted communication start channel 220 to one input, and the busy control channel 222A to the other input, the C-element generates the clock gate signal for CGC 110. Thus, the AWC 210B is used to generate the clock gate signal from the communication start signal and the busy control signal.

FIG. 3B illustrates a timing diagram for the AWC 210B of the asynchronous wrapper of FIG. 3A. The communication start signal 350 can assert 360, but then may de-assert 361, even before the gated clock has started (which allows for shorter pulse relative to communication start signal 350 of FIG. 2A). The clock gate signal 354 is de-asserted 364 shortly after the communication start signal 250 is asserted 360. The busy control 352 signal then asserts 372 (e.g., with a pulse) at the end of the communication when the function block 240 (or system) goes into an idle mode (i.e., after the communication start signal 350 stops 370). The busy control signal 352 is an indication that a computation in the function block has ended. The busy control signal 352 turns on the clock gating (i.e., stop the gated clock).

FIG. 3A resembles an asynchronous design over a clocked (synchronous) design because the clock turn offs before a final edge is latched that de-asserts the busy control signal 352 at the end of the pulse 373.

FIG. 4A illustrates an asynchronous wrapper using an asynchronous finite state machine (AFSM) 410. AFSM is a finite state machine for an asynchronous design. A finite state machine (FSM) is a sequential logic circuit that can be in one of a finite number of states. The state machine is in only one state at a time; the state the circuit it is in at any given time is called the current state. The finite state machine can change from one state to another when initiated by a triggering event or condition called a transition. A particular finite state machine is defined by a list of its states, and the triggering condition for each transition. AFSM operation is timed by input variable changes. The AFSM state variables can be stored in gate delays and the state variables can change at any time (without reference to clock).

An AWC 210C provides an example of the front end circuitry to generate the enable signal (e.g., logic zero) and disable signal (e.g., logic one) for the CGC 110. The communication start channel 220 and the busy control channel 222A are coupled to inputs of the AFSM 410 and the clock gate channel 224 is coupled to the output of the AFSM 410. The AFSM 410 of the AWC 210C generates the clock gate signal from different states based on the communication start signal and the busy control signal.

FIG. 4B illustrates a timing diagram for the AWC 210C of the asynchronous wrapper of FIG. 4A. The communication start signal 450 may pulse 460 before the busy control 452 signal asserts 462. The AFSM is designed to de-assert 464 the clock gate signal 454 on or shortly after the rising edge 460 of the communication start signal 450, and keep the clock gate signal 454 de-asserted 474 until or shortly after the falling edge 472 of busy control signal 452, at which point the clock gate signal 454 re-asserts 474. The falling edge 472 of busy control signal 452 occurs after communication start signal 450 goes idle 470, when the computation in the function block has ended, and the function block 240 goes into an idle mode.

As shown in FIGS. 2A, 2B, 3A, 3B, 4A, and 4B, the gated clock is started based on the communication start signal and the gated clock is stopped based on the busy control signal. Turning off the gated clock at the end of a message (or a computation in the function block) can be synchronized with the clock. The busy control signal used to turn off the gated clock is generated from local logic (e.g., in the function block) that is part of the local clock domain. FIGS. 2A, 3A, and 4A are provided as examples. Other designs that produce similar results can also be used.

If the incoming data is synchronized to the clock used to generate the gated clock, then the clock is enabled with the asynchronous signal (i.e., the communication start signal) of the incoming data, where the CGC 110 is used without a synchronizing function to pre-condition the incoming data or message. If the incoming data is not synchronized to the clock, then the asynchronous sampled start of transmission signal (i.e., the communication start signal) is synchronized to the clock before enabling the gated clock to the function block. The incoming data can be synchronized to the local clock domain using a synchronizing function before the signal reaches the CGC 110.

Figure 5A:
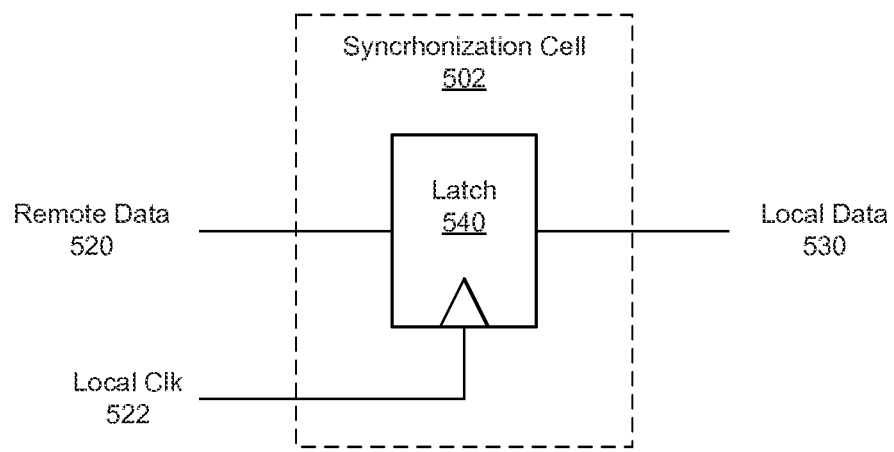
FIG. 5A illustrates a schematic diagram of a synchronization cell with a latch.
Figure 5B:
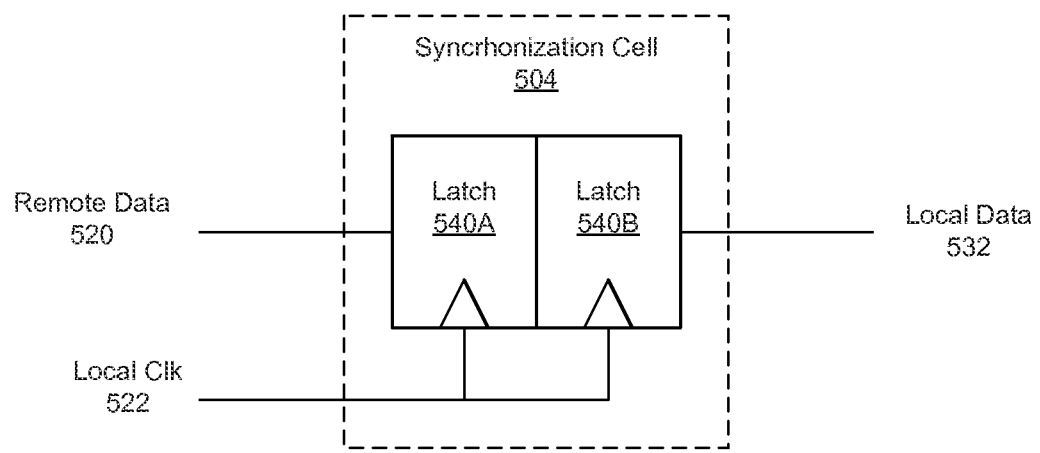
FIG. 5B illustrates a schematic diagram of a synchronization cell with two latches.
Figure 5C:
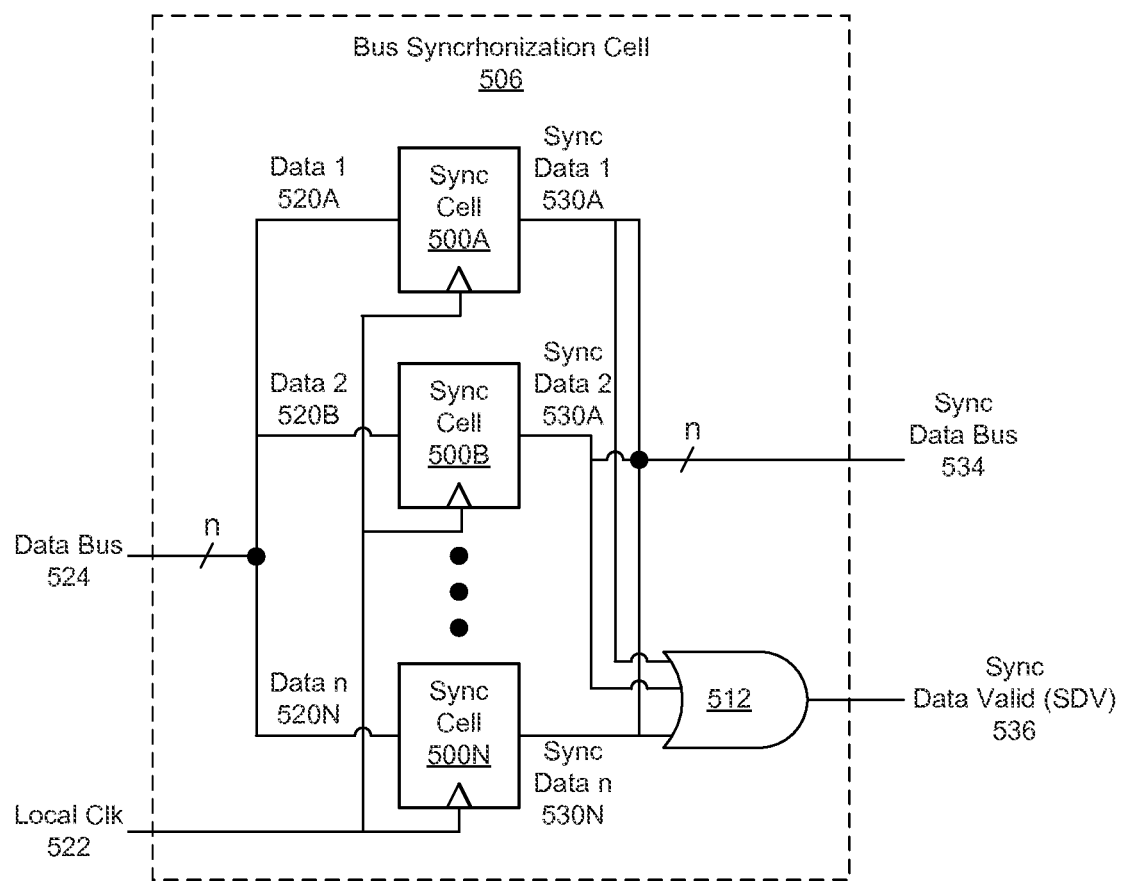
FIG. 5C illustrates a schematic diagram of a synchronization cell for data bus with a data valid output.

FIGS. 5A, 5B, and 5C illustrate examples of synchronization cells that provide the synchronizing function. The synchronization cells use a local clock. FIGS. 5A and 5B illustrate synchronization cells for a single data line. FIG. 5C illustrate a synchronization for a data bus (i.e., multiple data lines).

FIG. 5A illustrates an example of a synchronization cell 502 with a single latch 540 which is clocked by a local clock 522. The unsynchronized remote data 520 is coupled to the data input of the latch 540, the local clock is coupled to the clock input of the latch 540, and the output of the latch 540 provides local data 530 that is synchronized to the local clock. The single latch synchronization cell 502 can provide synchronization for low frequency data signals. In a low frequency data signal, the local clock has a frequency that is greater than two times the data signal frequency. For example, a high frequency clock operates at a frequency that is 16 times the transmission frequency of the low frequency data signal. The local data 530 provides synchronized data for a function block and a synchronized data valid (SDV) signal to enable the gated clock via the CGC 110. The local data 530 provides the communication start signal for the AWC.

FIG. 5B illustrates an example of a synchronization cell 504 with two latches 540A, 540B, which can be used for high frequency data signals. In a high frequency data signal, the local clock has a frequency that is less than or equal to two times the data signal frequency. The unsynchronized remote data 520 is coupled to the data input of the first latch 540A, the output of the first latch 540A is coupled to the data input of the second latch 540B, the local clock provide the clock to both latches 540A, 540B, and the output of the second latch 540B provides local data 532 that is synchronized to the local clock.

The local data 530, 532 provides synchronized data for processing in a function block and a synchronized data valid signal to enable the gated clock via the CGC 110 and the AWC. The local data 530, 532 provides the communication start signal for the AWC. A one to two clock latency may exist from when clock gate asserts until the clocks are turned on or off in the system depending on the number of latches in the synchronization cell. A specific design needs to account for and tolerate the latency due to the synchronization cell.

FIG. 5C illustrates an example of a bus synchronization cell 506 for a data bus 524 with n number of unsynchronized data lines 520A, 520B, 520N. The n number represents a positive integer of data lines (including a single data line). The synchronization cell 506 generates synchronized data signals on a synchronized data bus 534 with multiple unsynchronized data lines 530A, 530B, 530N as well as a synchronized data valid signal on a synchronized data valid (SDV) channel 536 that provides the communication start signal for the AWC. The bus synchronization cell 506 include a synchronization cell 500A, 500B, 500N for each data line input 520A, 520B, 520N, which generates a corresponding synchronized output 530A, 530B, 530N, which are clocked by the local clock 522. The synchronization cells 500A, 500B, 500N may be configured with the synchronization cells 502, 504 shown in FIGS. 5A and 5B or other synchronization cell with a similar function.

The synchronized data valid signal 536 is generated by combining the synchronized output 530A, 530B, 530N using a logical OR gate 512. As a result, any activity on any of the data lines will generate the synchronized data valid signal. The synchronized data valid signal can be generated from one data line, a subset of data lines, or all the data lines in the data bus 524. In another example, a logical OR gate may be coupled to the unsynchronized data lines 520A, 520B, 520N to generate data valid signal. FIGS. 5A, 5B, and 5C illustrate examples of synchronization cells for data lines and data buses, but any method known by those expert in the art for synchronization may be used to provide synchronization cell functionality and/or synchronize the data message with the local clock. The synchronization cell occurs in the circuit design before the AWC and CGC 110 so the local clock is not gated.

Figure 6A:
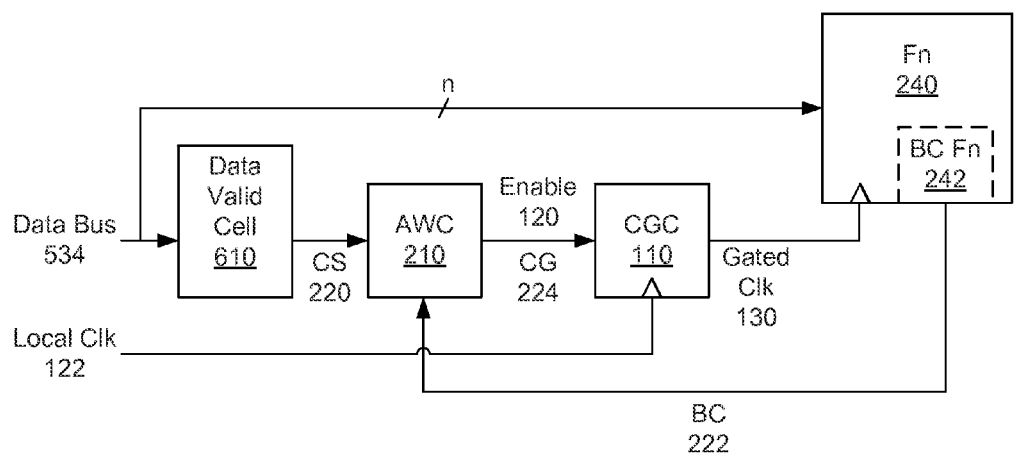
FIG. 6A illustrates a schematic diagram of an asynchronous wrapper cell for a clock gating cell configured to provide a gated clock for a function cell.

FIG. 6A illustrates an example of the AWC 210 for the CGC 110 configured to provide a gated clock for the function block 240. The data on the data bus 534 may be synchronized with the local clock 122 and coupled to the function block 240 and a data valid cell 610 used to generate the synchronized data valid signal (i.e., communication start signal on the communication start channel 220). In an example, the data valid cell includes a logical OR gate to combine the activity on the data bus 534. If the data bus is a single line (i.e., n=1), the data valid cell 610 may couple the data bus 534 to the communication start channel 220 (e.g., wire or similar conductor). The AWC 210, CGC 110, and busy control function block 242 operate in a manner described previously and shown in FIGS. 2A, 3A, and 4A. The busy control function block 242 provides the busy control signal to the AWC 210.

Figure 6B:
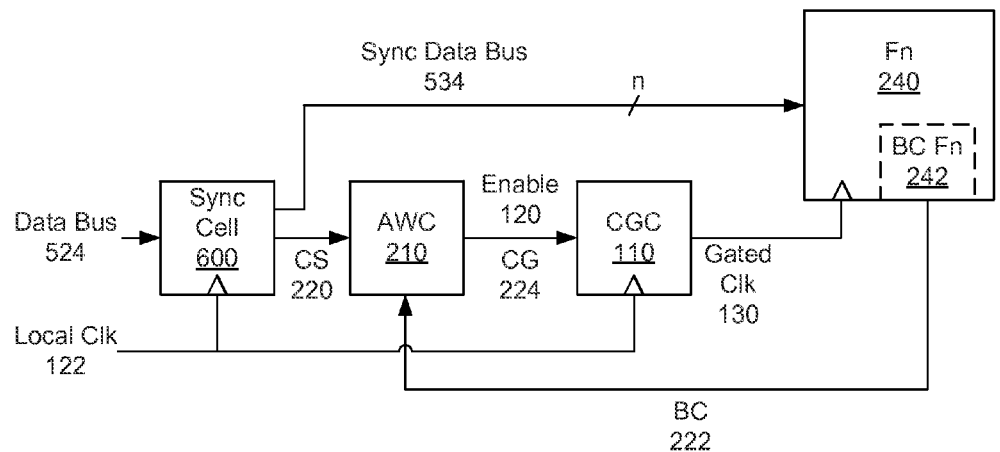
FIG. 6B illustrates a schematic diagram of a synchronization cell and an asynchronous wrapper cell for a clock gating cell configured to provide a gated clock for a function cell.

FIG. 6B illustrates an example of a synchronization cell 500 and an AWC 210 for the CGC 110 configured to provide the gated clock for the function cell 240. The synchronization cell 600 can provide the communication start signal (i.e., the synchronized data valid signal) for the AWC 210 and the synchronized data bus 534 for the function cell 240 from an unsynchronized data bus 524. If the data bus is a single line (i.e., n=1), the synchronized data bus 534 is also the communication start channel 220. The synchronization cell 600 can include the bus synchronization cell 502, 504, 506 described previously and shown in FIGS. 5A, 5B, 5C. If the communication start signal 220 is synchronized with the local clock, then the gated clock is enabled the next clock cycle.

Figure 6C:
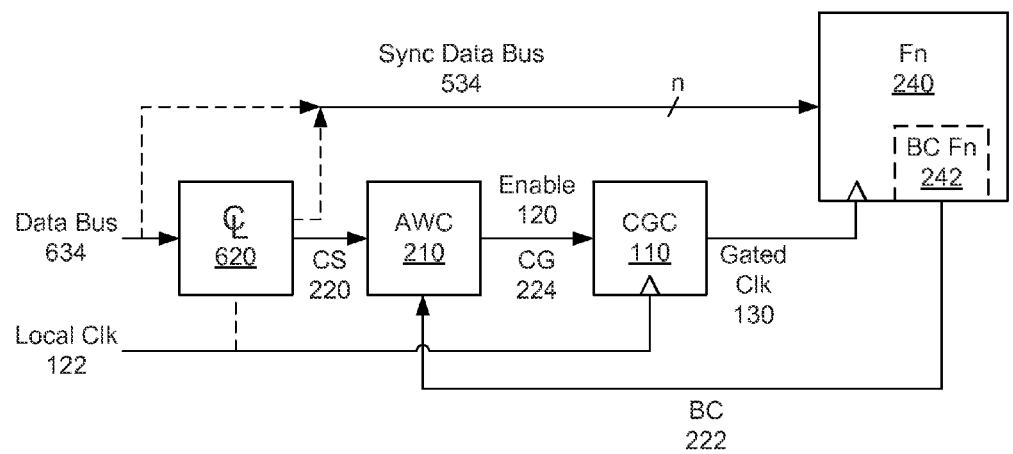
FIG. 6C illustrates a schematic diagram of combinational logic and an asynchronous wrapper cell for a clock gating cell configured to provide a gated clock for a function cell.

FIG. 6C illustrates an example of combinational logic and the AWC 210 for the CGC 110 configured to provide the gated clock for the function cell 240. The combinational logic 620 can include preprocessing of the data bus 634 to generate the communication start signal for the AWC 210. The combinational logic can include clocked components (e.g., latches and registers) and/or non-clock components (e.g., gates). The combinational logic 620 can include a synchronization cell 502, 504, 506, 600.

Figure 6D:
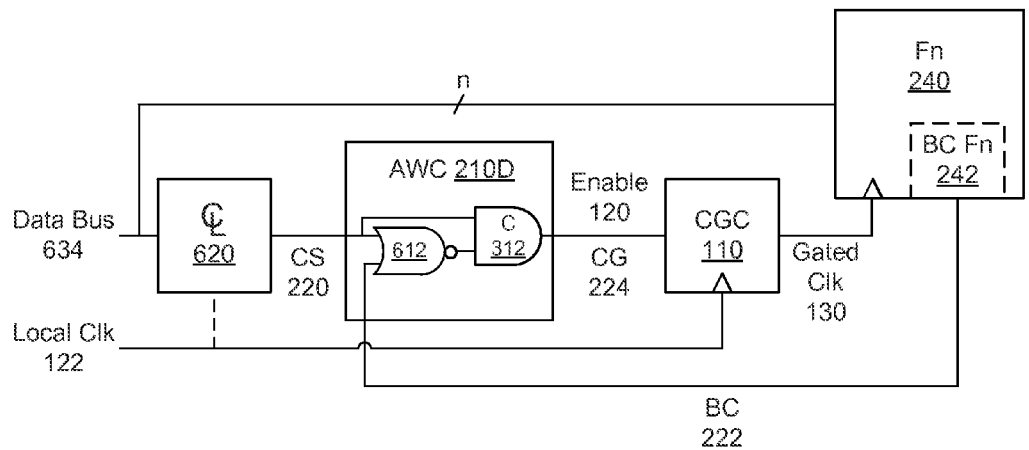
FIG. 6D illustrates a schematic diagram of combinational logic and an asynchronous wrapper cell for a clock gating cell configured to provide a gated clock for a function cell.

FIG. 6D illustrates another example of combinational logic 620 and the AWC 210D for the CGC 110 configured to provide the gated clock for the function cell 240. The AWC 210D includes a NOR gate 612 and a C-element 312. The NOR gate inputs include the communication start channel 220 and the busy control channel 222 with a NOR gate output coupled to an input of the C-element. The other C-element input is coupled to the communication start channel 220 with a C-element output generating the clock gate signal.

Figure 7:
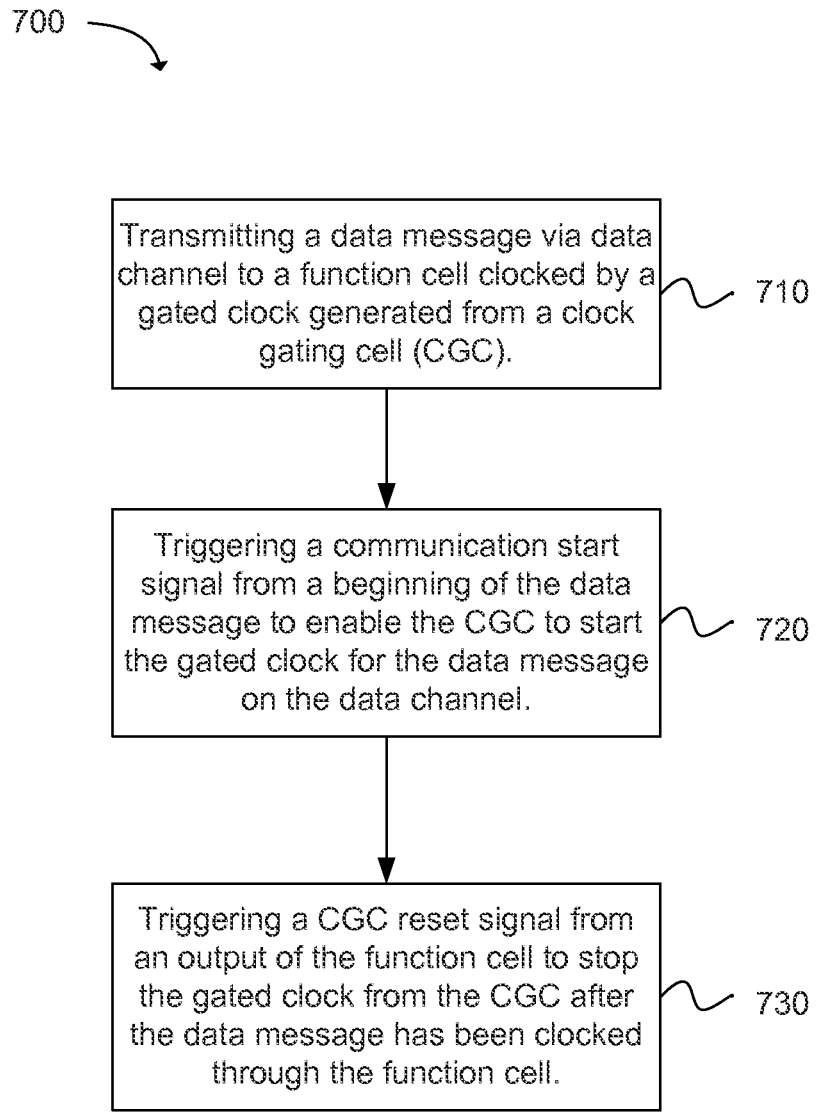
FIG. 7 is flowchart illustrating an example of a method of generating asynchronous control for a clock gating cell.

The flow chart shown in FIG. 7 illustrates a method 700 of generating asynchronous control for a CGC. The method includes the step of transmitting a data message via a data channel to a function cell clocked by a gated clock generated from the CGC, as in step 710. The step of triggering a communication start signal from a beginning of the data message to enable the CGC to start the gated clock for the data message on the data channel follows, as in step 720. The next step of the method is triggering a CGC reset signal from an output of the function cell to stop the gated clock from the CGC after the data message has been clocked through the function cell, as in step 730.

The asynchronous wrapper used in reactive clock gating may be applicable to many digital circuit designs which employ communication systems. The following provides additional details on the application of the asynchronous wrapper in communication circuits and systems. Most communication use frequency based designs. Data transfer is performed in the frequency domain, and so accurate clocks (i.e., clocks with low skew and drift) are used in order to increase throughput. Thus, conventional clocking methods, such as crystal oscillators and phase-locked loops (PLLs), are used to ensure frequency fidelity.

In such communication scenarios, a communication link remains active. Typically, full bandwidth communication occurs for a small percentage time across the communication link. Since a conventional communication device listens to the link at all times in order to determine if a new transmission has initiated, significant energy can be expended sampling the link in order to determine if a new communication message has arrived on the link. Conventional clocked methods continually sample or "poll" the link to determine if a new data message or sample has arrived.

The UART provides an example of a communication device that can benefit from the asynchronous wrapper. The UART uses a serial communication protocol. In an inactive channel, the signal remains at a logical high voltage. A new transmission is preceded by a start bit, followed by data, and terminated by a stop bit. The start bit serves the purpose of preparing the system to receive a transmission and synchronizing the incoming transmission to the local clock. Typically, the serial data input line of a UART is continually sampled in order to determine when a new transmission has occurred. The polling or sampling typically occurs with a high frequency clock, often operating at sixteen (16) times the transmission frequency of the data channel. Due to the high frequency sampling, power can be significantly reduced if the sampling can be avoided. In the case of the UART, the power can be reduced by up to a factor of four in typical use scenarios using reactive clock gating. Other communication circuits and devices can also have significant reductions in dynamic power usage.

Reactive clock gating allows the detection of new transmissions on the channel to occur without using polling or sampling. Reactive clock gating is based on the following observations and/or requirements.

First, the data channel has two states (i.e., active and idle), where moving between these states may be performed with combinational logic. The first state is an idle state that occurs when no current transmission is occurring on the data channel. The second is an active or busy state marked by the beginning of a data transmission. Encoding combinational logic such that a single monotonic event can be detected allows for reactive clock gating and provides the asynchronous wrapper circuit with the ability to distinguish the movement from the idle to the busy state. A monotonic signal (i.e., glitch free signal) is a signal that only switches between stable states (e.g., switches once between states or makes no state changes) in a clock cycle. The idle identification state is continually present when no transmissions are occurring. In the UART example, this occurs when the serial input signal remains at a high voltage. In other examples, the idle state occurs with the input signal is a low voltage.

Second, if the incoming transmission is not synchronized to the local clock, then a messaging protocol should allow a small latency window to synchronize the transmission to the local timing domain. If the incoming transmission is already synchronized to the local clock then this latency window is not needed.

Third, reactive clock gating can place the circuit or system in a fully clock gated state (i.e., idle state) when the transmission has completed.

Fourth, in some designs, the function block (e.g., communication block) may also be powered down with sufficient time delays between the start of transmission and data processing. If the function block is powered down, some buffering logic may be employed to allow a larger window for powering the function block back up.

Reactive clock gating has various advantages over conventional clock gating circuits. For example, the reactive clock gating circuits, systems, and methods can lower the power use in clocked digital electronics which employ data sampling or data streams, such as electronics used in communication systems. Conventional clock gating approaches rely entirely on a clocked paradigm and cannot be fully idle since the clock must be used to observe and sample events (e.g., data messages). In many systems (e.g., communication systems) events are relatively rare (compared with the clock frequency) and a significant expenditure of energy is used to continually sampling for these events. The following provides two advantages using the reactive clock gating cell, but other advantages also exist.

First, the reactive clock gating cell results in a circuit that completely turns off the clock to a logic block (e.g., function cell) and uses almost no active energy to continuously sample a data stream for a valid input. The function cell may even be powered off further reducing power consumption, if sufficient time is available to power the function cell back up when data arrives.

Second, when the reactive clock gating cell is used, minimal to no delay exists between the time the event occurs and the time that the system begins to turn on the clock to begin processing. In conventional communication systems, energy can be reduced by lowering the sampling rate. Such an approach of lowering the sampling rate may create significant latencies between data arrival and data processing. Lowering the sampling rate may also result in non-deterministic delay properties based on the arrival times of the data in relation to the lowered frequency clock. When using the reactive clock gating cell, the sampling rate does not need to be altered to generate a power savings.

The reactive clock gating cell can use these advantages in a circuit that typically continuously polls for a data stream, where active data processing is relatively rare. For example, reactive clock gating can be used with UART or I2C blocks. As previously discussed, reactive clock gating in some circuits can lower the average power to approximately one-fourth the power used in typical clock gating scenarios.

Reactive clock gating can be applied to a digital design where a monotonic combinational logic signal is generated that indicates a valid data sample has arrived. The data validity signal (e.g., communication start signal) should be monotonic for proper reactive clock gating. Without a monotonic communication start signal, the clock may be enabled without a corresponding mechanism to turn off the clock, because the glitch may not propagate through the function block. Various clocked designs that have monotonic signals where reactive clock gating can be used include but are not limited to UART, I2C, I2S, SPI, and other communication interfaces, peripherals, and protocols.

Reactive clock gating can be applied to wireless communications, such as third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi, Bluetooth, and other protocols used by mobile phones and other hardware.

Reactive clock gating differs from globally asynchronous locally synchronous (GALS) systems and has various advantages over GALS systems. A GALS system or circuit includes of a set of locally synchronous modules communicating with each other via asynchronous wrappers. The GALS model is a compromise between a completely synchronous system (a single clock domain with clock gating on some registers) and a completely asynchronous circuit (e.g., every register can be considered its own independent clock domain). The wrappers used in the GALS system enclose a local clock in each block (i.e., synchronous module) and the control logic for communication with each block is based on handshakes. In the GALS system, each synchronous subsystem ("clock domain") can run on its own independent clock frequency. The synchronous subsystem of the GALS system still uses the clock to sample the data channel, which consumes power. The synchronous subsystems of the GALS system are just operating of different local clocks, which may not be controlled by a central clock. Reactive clock gating does not use a clock to sample the data channel, thus reduces power consumption.

Circuitry can include hardware, firmware, program code, executable code, computer instructions, and/or software. A non-transitory computer readable storage medium can be a computer readable storage medium that does not include signal.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors, including but not limited to logic chips, transistors, or other discrete components. A module may also be implemented in programmable hardware devices, including but not limited to field programmable gate arrays (FPGA), programmable array logic, programmable logic devices or similar devices.

Reference throughout this specification to an "example" or an "embodiment" means that a particular feature, structure, or characteristic described in connection with the example is included in at least one embodiment of the present invention. Thus, appearances of the words an "example" or an "embodiment" in various places throughout this specification are not necessarily all referring to the same embodiment.

Furthermore, the described features, structures, or characteristics may be combined in any suitable manner in one or more embodiments. In the following description, numerous specific details are provided (e.g., examples of layouts and designs) to provide a thorough understanding of embodiments of the invention. One skilled in the relevant art will recognize, however, that the invention can be practiced without one or more of the specific details, or with other methods, components, layouts, etc. In other instances, well-known structures, components, or operations are not shown or described in detail to avoid obscuring aspects of the invention.

While the forgoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited. Various features and advantages of the invention are set forth in the following claims.

What is claimed is:

1. A reactive clock gating cell, comprising:
 a clock gating cell (CGC) to generate a gated clock from an enabled clock, wherein the gated clock provides a clock for a function cell;

a sampling circuit to sample a data channel for a communication start signal that enables the CGC to start the gated clock for a data message on the data channel; and an idle mode control circuit coupled to the function cell and the sampling circuit, the idle mode control circuit being configured to reset an enable of the CGC to an idle mode after the data message has been clocked through the function cell.

2. The reactive clock gating cell of claim 1, wherein the sampling circuit includes:

an OR gate with OR gate inputs coupled to an idle mode control circuit output and the data channel.

3. The reactive clock gating cell of claim 1, wherein the sampling circuit includes:

an asynchronous finite state machine (AFSM) with AFSM inputs coupled to an idle mode control circuit output and the data channel.

4. The reactive clock gating cell of claim 1, wherein the sampling circuit includes:

an inverter with an inverter input coupled to the data channel; and a C-element with C-element inputs coupled to an idle mode control circuit output and an inverter output.

5. The reactive clock gating cell of claim 1, wherein the sampling circuit includes:

a NOR gate with NOR gate inputs that include a coupling to an idle mode control circuit output and the data channel; and a C-element with C-element inputs that include a coupling to a NOR gate output and the data channel.

6. The reactive clock gating cell of claim 1, wherein the data message is a monotonic combinational logic signal.

7. The reactive clock gating cell of claim 1, further comprising a synchronization cell coupled between the data channel and inputs to the sampling circuit, wherein the synchronization cell synchronizes the data message to a clock and the synchronization cell includes a synchronization cell clock input coupled to the clock, an synchronization cell data input coupled to the data channel, and a synchronization cell output coupled to a data channel input of the sampling circuit.

8. The reactive clock gating cell of claim 7, wherein the synchronization cell includes at least two latches in series to further synchronize the data message, wherein a first synchronization latch data input is coupled to the data channel, a first synchronization latch output is coupled to a second synchronization latch data input, and a second synchronization latch output is coupled to the data channel input of the sampling circuit.

9. The reactive clock gating cell of claim 1, wherein the idle mode control circuit generates a reset signal after an entire data message propagates through the function cell.

10. The reactive clock gating cell of claim 9, wherein the idle mode control circuit is integrated with the function cell.

11. The reactive clock gating cell of claim 1, wherein the CGC includes:

a latch that includes a latch clock input, an enable input, and a latch output, wherein the latch clock input is coupled to a clock and the enable input is coupled to a sampling circuit output; and an AND gate with AND gate inputs coupled to the latch output and the clock, and an AND gate output provides the gated clock.

12. The reactive clock gating cell of claim 1, wherein the function cell includes a universal asynchronous receiver/transmitter (UART), an inter-integrated circuit (I$^2$C), an integrated interchip sound (I$^2$S), or serial peripheral interface (SPI).

13. An asynchronous wrapper circuit for a clock gating cell (CGC), having circuitry configured to:

sample a data channel via sampling circuitry for a communication start signal to enable the CGC to start a gated clock for a data message on the data channel; and reset an enable of the CGC to an idle mode via idle mode control circuitry after the data message has been clocked via the CGC through function cell circuitry, the idle mode control circuitry generating an output for the sampling circuitry from the function cell circuitry.

14. The circuitry of claim 13, further configured to:

generate the gated clock from an enabled clock via CGC circuitry, wherein the gated clock provides a clock for the function cell circuitry.

15. The circuitry of claim 13, further configured to:

generate gated function via the function cell circuitry clocked by the gated clock.

16. A method of generating asynchronous control for a clock gating cell (CGC), comprising:

transmitting a data message via data channel to a function cell clocked by a gated clock generated from the CGC;

triggering a communication start signal from a beginning of the data message to enable the CGC to start the gated clock for the data message on the data channel; and triggering a CGC reset signal from an output of the function cell to stop the gated clock from the CGC after the data message has been clocked through the function cell.

17. The method of claim 16, wherein triggering the CGC reset signal further comprises:

triggering a busy control signal from the communication start signal or the data message;

asserting the busy control signal during propagation of the data message through the function cell; and de-asserting the busy control signal after the data message has been clocked through the function cell.

18. The method of claim 16, wherein triggering the communication start signal further comprises generating a pulse to enable the CGC to start the gated clock; or triggering the CGC reset signal further comprises generating a pulse to disable the CGC to stop the gated clock.

19. A computing device comprising computing circuitry adapted to implement the method of claim 16.

* * * * *